(12) United States Patent
Waide

(10) Patent No.: US 9,207,713 B1
(45) Date of Patent: Dec. 8, 2015

(54) LOCATION-BASED DEVICE DOCKING

(75) Inventor: Ronan C. Waide, Dublin (IE)

(73) Assignee: Amazon Technologies, Inc., Reno, NV (US)

(*) Notice: Subject to any disclaimer, the term of this patent is extended or adjusted under 35 U.S.C. 154(b) by 230 days.

(21) Appl. No.: 13/421,598

(22) Filed: Mar. 15, 2012

(51) Int. Cl.
*G06F 3/00* (2006.01)
*G06F 1/16* (2006.01)
*G06F 21/85* (2013.01)

(52) U.S. Cl.
CPC .............. *G06F 1/1632* (2013.01); *G06F 21/85* (2013.01)

(58) Field of Classification Search
CPC ................................. G06F 1/1632; G06F 21/85
See application file for complete search history.

(56) References Cited

U.S. PATENT DOCUMENTS

| | | | |
|---|---|---|---|
| 7,077,328 B2* | 7/2006 | Krishnaswamy et al. | 235/472.01 |
| 7,316,648 B2* | 1/2008 | Kelly et al. | 600/300 |
| 8,398,982 B2* | 3/2013 | Dowd et al. | 424/178.1 |
| 8,402,145 B2* | 3/2013 | Holden et al. | 709/227 |
| 8,527,688 B2* | 9/2013 | Chatterjee et al. | 710/303 |
| 2010/0131691 A1* | 5/2010 | Chatterjee et al. | 710/303 |
| 2010/0138581 A1* | 6/2010 | Bird et al. | 710/303 |
| 2011/0021247 A1* | 1/2011 | Shih | 455/557 |
| 2011/0131358 A1* | 6/2011 | Ganesh et al. | 710/304 |
| 2011/0162035 A1* | 6/2011 | King et al. | 726/1 |
| 2011/0291927 A1* | 12/2011 | Slaby et al. | 345/158 |
| 2012/0153016 A1* | 6/2012 | Slaby et al. | 235/375 |
| 2012/0324135 A1* | 12/2012 | Goodman et al. | 710/304 |

OTHER PUBLICATIONS

"Apple introduces us to the Smart Dock for the MacBook & More", Jun. 30, 2011, by Jack Purcher; downloaded from http://www.patentlyapple.com/patently-apple/2011/06/apple-introduces-us-to-the-smart-dock-for-the-macbook-more.html#more.*

* cited by examiner

*Primary Examiner* — Henry Tsai
*Assistant Examiner* — Jing-Yih Shyu
(74) *Attorney, Agent, or Firm* — Lee & Hayes, PLLC

(57) ABSTRACT

Multiple device rests may be placed in different locations for use with a portable device such as a smartphone, tablet computer, controller, gaming device, etc. Upon being placed in one of the device rests, the portable device receives an identifier that identifies the particular device rest and/or the location of the device rest. In response, the portable device is configured to initiate an action that has been previously associated with the particular device rest and or its location.

27 Claims, 4 Drawing Sheets

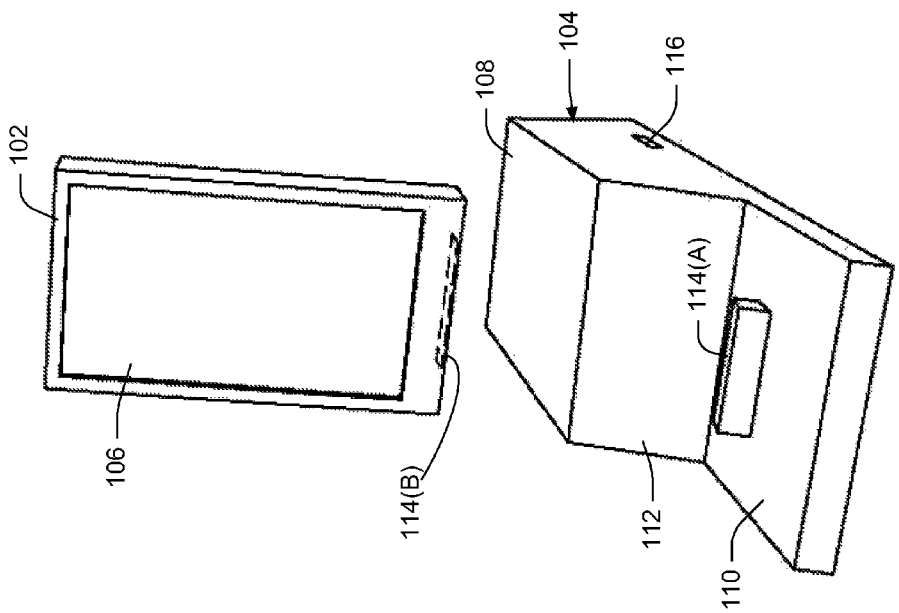
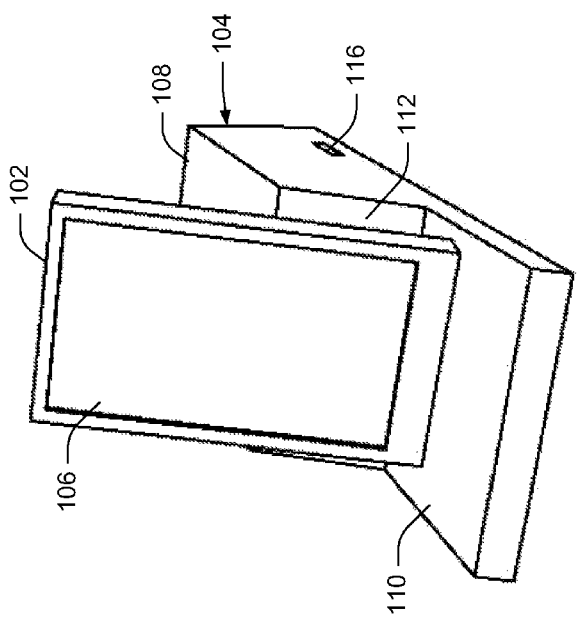

LOCATION-BASED DEVICE DOCKING

BACKGROUND

Personal electronic devices such as smartphones, tablet computers, gaming devices, and so forth typically allow their users to install a multitude of different programs or applications, each of which may be tailored to a different task or activity. For example, different applications might be installed for accessing food recipes, for keeping track of exercise and fitness goals, for viewing movies, for listening to music, for setting morning wakeup alarms, and so forth.

Although the ability to utilize such a wide variety of applications can be a great convenience, it can be cumbersome and time-consuming to navigate through the numerous installed applications and to launch a desired application at the particular time when it is needed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1 is a perspective view of a portable device and a mating device rest that support location-based functions.

FIG. 2 is an exploded perspective view of the portable device and device rest of FIG. 1

DETAILED DESCRIPTION

Overview

Figure 3:
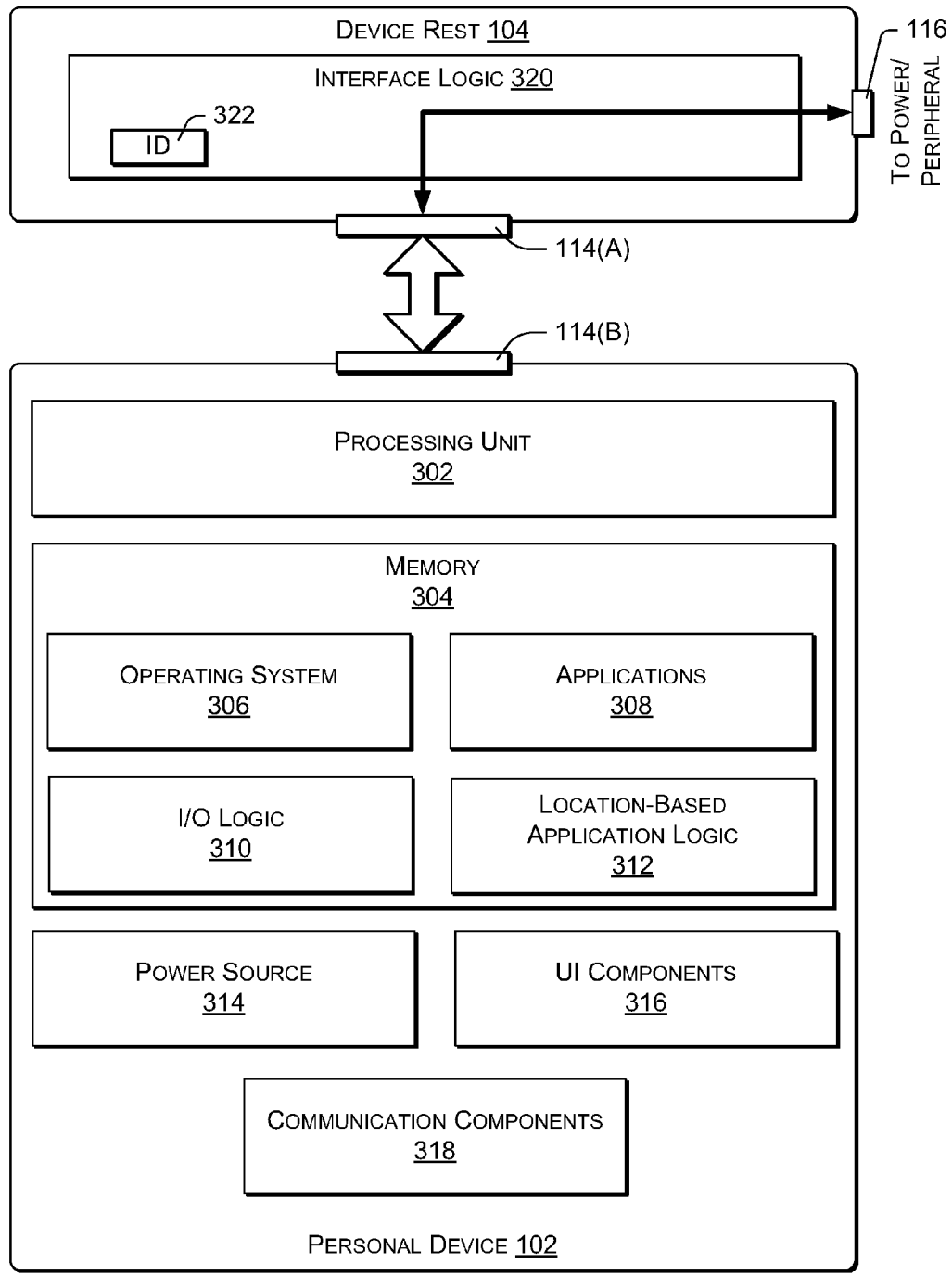
FIG. 3 is a block diagram illustrating example functional implementations and interactions that may be implemented by the portable device and device rest of FIG. 1.

This disclosure describes devices and techniques that support the use of a multifunction personal device in multiple locations. A device rest or dock can be placed in each of the locations, such as in different rooms of a house. When a portable device is placed on the device rest, the portable device receives an identifier from the device rest that uniquely identifies the device rest and/or the location of the device rest. Each device rest can be associated by the user with a particular location and/or activity, and the portable device may be configured to launch different applications and/or perform different actions upon being placed in different device rests at different locations.

Example Device and Rest

FIGS. 1 and 2 show examples of a personal device 102 and a device rest 104 such as may be used in conjunction with the techniques described herein. The personal device 102 may be any portable device capable of performing various different functions and/or of executing various different applications. For example, the personal device 102 may be a device having computer-like functionality such as a laptop computer, notebook computer, smartphone, tablet computer, or similar type of device. Media consumption devices such as video players, personal music players, game devices, and so forth are other possible examples of the personal device 102.

The personal device 102 may in some embodiments have a visual display or display panel 106. The display panel 106 may in some embodiments comprise a touch-sensitive panel that provides for user input through the use of a fingertip or a stylus. In some embodiments, the personal device 102 may have one or more keys, buttons, or other actuators (not shown).

The device rest 104 may comprise a chassis 108 of any configuration that is capable of receiving and/or supporting the personal device 102. In the example of FIGS. 1 and 2, the chassis 108 has a horizontal ledge or shelf 110 and a vertically inclined back support surface 112. The personal device 102 may be placed upright on the shelf 110 of the chassis 108, where it may lean slightly rearward to rest against the inclined back support surface 112. The chassis 108 can of course take many other forms, depending on design objectives and the nature and/or shape of the personal device 102. In some embodiments, the device rest 104 may be a part of or be mounted to other equipment such as peripherals that are to be operated by or in conjunction with the personal device 102. For example, the device rest may be mounted in an automobile or integrated with equipment such as audio and video entertainment systems.

In some embodiments, the device rest 104 may have a device port or connector 114(A) that mates with a corresponding port or connector 114(B) of the personal device 102 when the personal device 102 is received by the chassis 108. The port or connectors 114(A) and 114(B) may provide or indicate a device or location indicator to the personal device 102 when the personal device 102 is placed onto the device rest 104.

The device port 114(A) may in some embodiments be configured to charge the personal device 102 when the personal device 102 is received by the device rest 104, and may also provide or facilitate data communications with the personal device 102.

In some embodiments, the device rest 104 may also have an external connector 116 that can be used to connect the device rest 104 to a power source, to an external peripheral, to a computer, and/or to other types of devices. In some cases, the connectors 114 and 116 may allow the personal device 102 to communicate through the device rest 104 with other devices such as supervisory computers and/or peripheral devices.

The device rest 104 may be one instance of multiple such device rests that are identical except for having different location indicators. For example, the device rest 104 may be an instance of a particular product, product type, design, or model, where each instance of the product, product type, design, or model are configured with respectively unique location identifiers.

FIG. 3 illustrates relevant logical components of the personal device 102 and the device rest 104 in example implementations. The personal device 102 may be any portable device capable of multiple functions or activities. In this example, the personal device 102 is a computer-like device such as a smartphone or tablet computer which is relatively compact and easily carried by a user. Functionality of the personal device 102 may be implemented by a processing unit 302 composed one of one or more processors, and memory 304. The memory 304 may comprise computer storage media and may include volatile and nonvolatile memory. Thus, the memory 304 may include, but is not limited to, RAM, ROM, EEPROM, flash memory, or other memory technology, or any other medium which can be used to store media items or applications and data.

The memory 304 may be used to store any number of functional components, such as programs, logical components, and program modules that are executable by the processing unit 302. Thus, the memory 304 may store an operating system 306 and a plurality of pre-installed and/or user-installed applications 308 that can be launched by a user of the personal device 102. The applications 308 may be designed for many different activities and functions. A user may typically navigate graphically through a listing or display of the applications and/or corresponding activities, and may select or launch one of the applications 308 when desired. The user may also interact with the applications 308 and may instruct the applications to perform desired functions or operations, depending on the different characteristics of the applications 308.

Some of the applications 308 may be configured to control or work in conjunction with peripheral equipment, including passive devices such as speakers as well as active and/or intelligent devices such as entertainment systems, diagnostic equipment, exercise equipment, sensors, and so forth. Some of the applications 308 may also be configured to communicate with network-based components or services, such as components or entities that may be accessed through a public network such as the Internet.

The executable components of the personal device 102 may include input/output (I/O) logic 310 such as programs and drivers to support various types of I/O components. The I/O logic may be part of the operating system 306 and/or of the applications 308, and may support types of I/O such as network communications, device communications, port configuration and control, graphics output, user input, and so forth.

The executable components of the personal device 102 may also include location-based application logic 312. The location-based application logic 312 may be configured to interact with the device rest 104 to determine the current location of the personal device 102 and to perform actions that are appropriate for that location. Such actions may be configurable by a user of the personal device 102, and may include launching specific applications or initiating specific functions that are to be performed by the operating system 306 or one of the applications 308. Further details regarding location-based functionality will be described below.

The personal device 102 may include a power source 314, which may be a self-contained, rechargeable source such as a rechargeable battery. In some implementations, the power source 314 may be recharged by placing the personal device 102 on the device rest 104. Recharging power may be supplied through the connectors 114 of the device rest 104 and personal device 102 when the personal device 102 is mated with the device rest 104.

The personal device 102 may include various user interface (UI) components 316, which may include microphones, speakers, display panels, touch-based input mechanisms, keypads, and so forth. The personal device 102 may also include various communication components 318 such as network adapters, data interfaces, radio transceivers, and so forth. The communications components 318 may utilize wired and/or wireless communication technologies.

The personal device 102 may of course include many other logical, programmatic, and physical components, of which those described above are merely examples that are related to the discussion herein.

The device rest 104 may include, as described above, a port or connector 114(A) that mates with the corresponding port or connector 114(B) of the personal device 102 when the personal device 102 is received by the device rest 104. The device rest 104 may have internal interface logic 320 that may provide certain information to the personal device 102 through the port 114(A) to the personal device 102. The port 114(A) may also have physical or logical connectivity through the external connector 116 to external components such as power supplies, peripherals, and/or supervisory computers.

The interface logic 320 may comprise passive or active logic. For example, the interface logic 320 may comprise one or more read-only memory registers that may be read by the personal device 102 through the connectors 114 when the personal device 102 is received by the device rest 104. Alternatively, the interface logic may comprise a microprocessor, memory, and programmatic logic for communicating between the personal device 102 and the device rest 104. In some implementations, the interface logic 320 may comprise a programmable logic array or other type of preprogrammed logic.

The interface logic 320 may include or have access to a rest identifier or location identifier (ID) 322, which may different for each of a plurality of different device rests 104, and which may identify or correspond to one of a plurality of different locations. The interface logic provides the ID 322 to the personal device 102 through the connectors 114 when the personal device 102 and the device rest 104 are mated.

In situations where the device rest 104 is one of multiple identical device rests, each such device rest may be configured with a respectively unique ID 322, which may comprise a product instance identifier. Thus, even within a particular product line, each manufactured instance of the product may have a different ID 322.

In some embodiments, the ID 322 may able configurable by the personal device 102. For example, the ID 322 may comprise a non-volatile memory register that may be read from and written to by the personal device 102. Upon initially connecting to a particular device rest 104, the personal device 102 may assign an ID 322 to the device rest 104, and may write the ID 322 to the device rest 104 for future reference.

Note that the connectors 114 form a communications port between the personal device 102 and the device rest 104. Although shown as a wired connection, such a communications port may also be implemented wirelessly, and the ID 322 might be provided to the personal device 102 wirelessly. For example, the interface logic in some implementations may comprise a radio-frequency identification (RFID) tag or some other type of near-field identification mechanism. This might allow the personal device 102 to detect the ID 322 without a physical or wired connection between the personal device 102 and the device rest 104.

In operation, the location-based application logic 312 associates particular actions or applications with each of a plurality of different device rests 104 and/or their locations. These associations may be preconfigured or configured by a user of the personal device 102. Upon detecting a data connection between the personal device 102 and the device rest 104, the location-based application logic 312 reads or otherwise obtains the ID 322 from the interface logic 320 of the device rest 104. The location-based application logic 312 then identifies the action or application that has been associated with the device rest 104, and initiates that action or application.

Example Usage Scenarios

Figure 4:
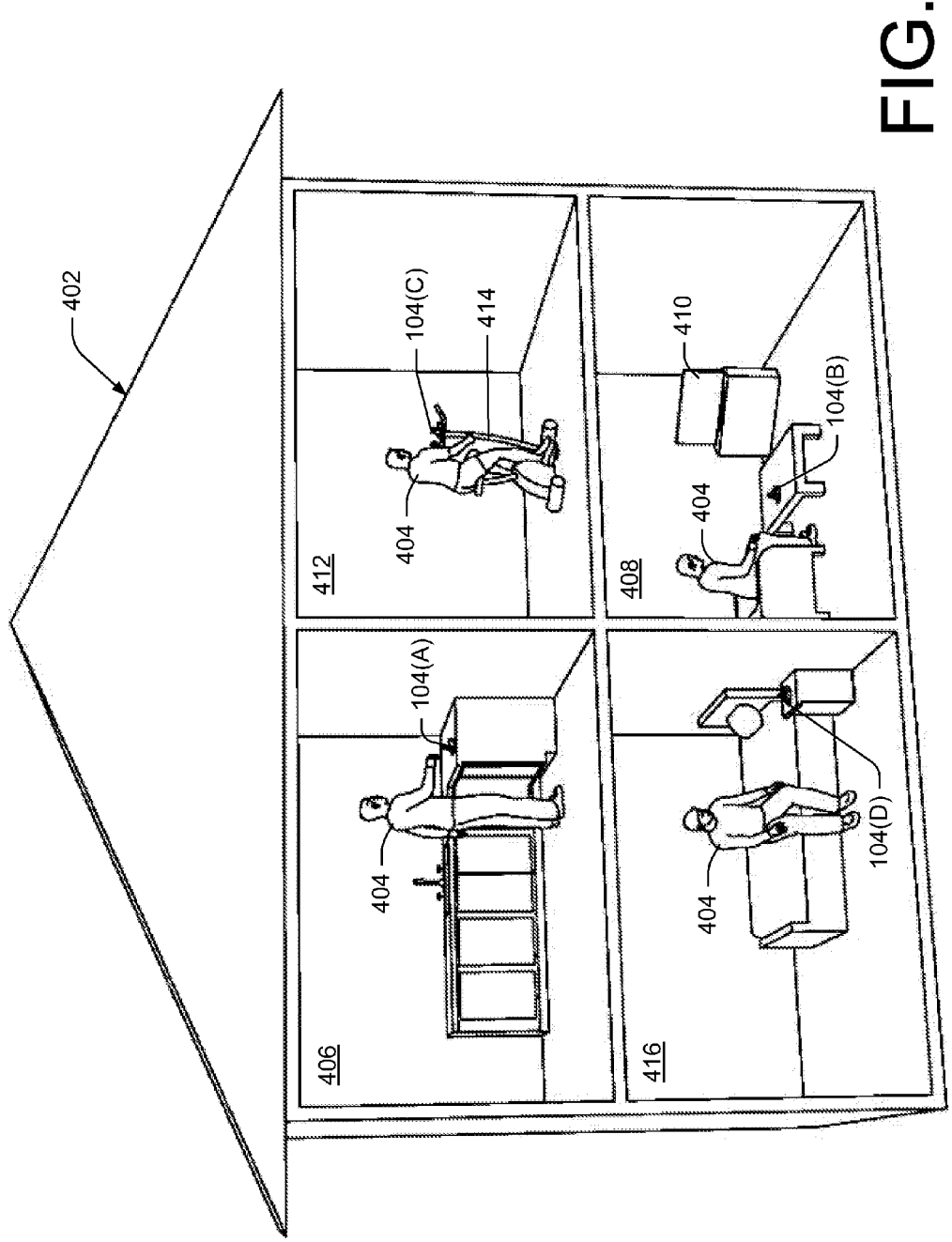
FIG. 4 is a diagram illustrating examples of different usage scenarios within a home for the portable device and device rest of FIG. 1.

FIG. 4 illustrates examples of how the device rest 104 may be used in different scenarios. FIG. 4 shows four rooms of a home 402 in which a user 404 may wish to perform different activities, which may in turn be associated with particular applications or actions that can be implemented by the personal device 102 of a user.

In a kitchen 406, a device rest 104(A) may be placed on a counter and a user 404, upon entering the room, may place his or her personal device 102 on the device rest 104(A). In response, the personal device 102 may query the device rest 104(A) to determine its ID 322. If this is the first time the personal device 102 has been mated with the device rest 104(A), the personal device 102 may prompt the user to identify the location of the device rest 104(A) and/or other information related to the location. For example, the personal device 102 may ask the user for a location name, such as "Kitchen". In addition, the personal device 102 may ask the user for an application to launch. In this example, the user may specify a recipe application that is to be launched when the personal device 102 is in the kitchen. After such configuration, the location-based application logic 312 may launch the recipe application whenever the personal device 102 is placed in the device rest 104(A).

In a media room 408, a user may wish to use their personal device 102 in conjunction with a media system or entertainment system 410. For example, the user's personal device 102 may have an application 308 that can control aspects of the entertainment system 410, such as by changing channels and so forth. The same application or a different application may present various menus to the user 404, such as an interactive guide to available programming.

In this example, the user 404 may configure his or her personal device 102 to launch such a media controller application whenever the personal device 102 is docked with a device rest 104(B) located in the media room 408. The media controller application may use the communications capabilities of the personal device 102 to communicate with and control various entertainment system components, as well as to receive and present programming information from network based services.

An exercise room 412 may contain computerized exercise equipment such as a stationary bicycle 414. A device rest 104(C) may be attached to or integrated with the stationary bicycle 414. For example, the device rest 104(C) may be mounted to the handlebars of the stationary bicycle 414. In addition, the external connector 116 of the device rest 104(C) may be connected to control components of the stationary bicycle 414, and an exercise program installed on the user's personal device 102 may be executable to control operational aspects of the stationary bicycle 414 through the connectors 114 and the external connector 116.

In this example, the user 404 may configure his or her personal device 102 to launch the exercise program when the personal device 102 is placed in the device rest 104(C). The exercise program itself may be configured according to preferences of the user 404, and may provide configuration or operational information for operation of the stationary bicycle 414. For example, the exercise program may access the Internet to obtain workout information that is customized to preferences of the user, and may actively configure the stationary bicycle 414 accordingly. In addition, the exercise program may monitor the user's exercise performance by receiving information from the user 404 and/or from the stationary bicycle 414. Information regarding the user's performance and exercise history may be stored by the personal device 102 and/or uploaded to a network service such as an Internet-based provider.

As another example, a device rest 104(D) may be place in a bedroom 416, such as on a nightstand beside a user's bed. Upon being placed in the device rest 104(D), a user's personal device 102 may be configured by the user to implement certain settings. For example, the personal device 102 may be configured to enable an alarm and/or to enable audio output so that an alarm may be heard. As another example, the personal device 102 may be configured to leave its screen on, and to continuously display a clock application.

The concepts described above may be used in a variety of different scenarios, in which functionality of a personal device 102 is tailored to the location in which it finds itself. Use within an automobile might be another example, in which a navigation application may be initiated upon placement of the personal device 102 in a device rest 104 within the automobile.

Example Device Interaction

Figure 5:
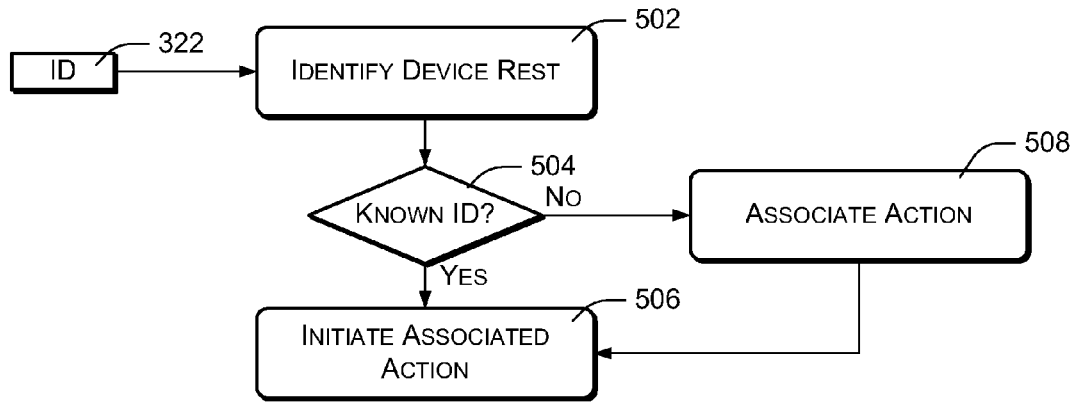
FIG. 5 is a flow diagram illustrating operational aspects of the portable device and device rest of FIG. 1.

FIG. 5 illustrates an example of how the personal device 102 may operate in response to the device rest 104 to initiate actions that have been associated with certain locations. The elements of FIG. 5 may be performed by the location-based application logic 312 of the personal device 102 or by other logic associated with the personal device 102.

An act 502 may comprise identifying or attempting to identify a particular device rest 104 when the personal device 102 is received by the device rest 104. This may comprise querying the device rest 104 for the ID 322 associated with or assigned to the device rest 104. The act 502 may be performed upon connection of the personal device 102 to the device rest 104. In certain embodiments, the device rest 104 may be preconfigured with the ID 322. In other embodiments the device rest 104 may be initially unconfigured, and may not return the ID 322 to the requesting personal device 102 upon an initial connection.

The IDs of multiple device rests 104 may comprise serial numbers or other identifiers that are unique to individual device rests 104, including device rests 104 that are instances of a particular product model and that are thus otherwise identical. In some cases, the ID 322 may include additional information, such as characteristics of the device rest 104 or characteristics of peripheral equipment with which the device rest 104 is associated. For example, in the example of the stationary bicycle discussed above, the ID 322 may identify the stationary bicycle, such as by model number, as well as indicating a serial number corresponding to the bicycle. In certain cases, the ID 322 may include explicit location information, such as by indicating that the device rest 104 is in an automobile. This might be the case, for example, when a particular model of a design rest is purposely designed for automobile installation.

An act 504, in response to attempting to identify the device rest 104, may comprise determining whether the device rest 104 is already known to the personal device 102 and has been associated with a desired action. If so, an action 506 is performed, which comprises initiating or implementing the action that has previously been associated with the device rest 104 and/or the location of the device rest 104.

If the device rest 104 is not known to the personal device 102 or has not been previously associated with a desired action, an act 508 is performed of associating an action with the device rest 104. In some embodiments, this may include creating the ID 322, assigning the ID 322 to the device rest 104, and writing the ID 322 to the device rest 104. In other embodiments, the device rest 104 may have been preconfigured with the ID 322.

Associating an action with the device rest 104 may be performed by prompting the user to identify an action, through an interactive menu that lists different available actions. By connecting the personal device 102 to device rests 104 in different locations, different actions may be associated with different device rests 104.

Figure 6:
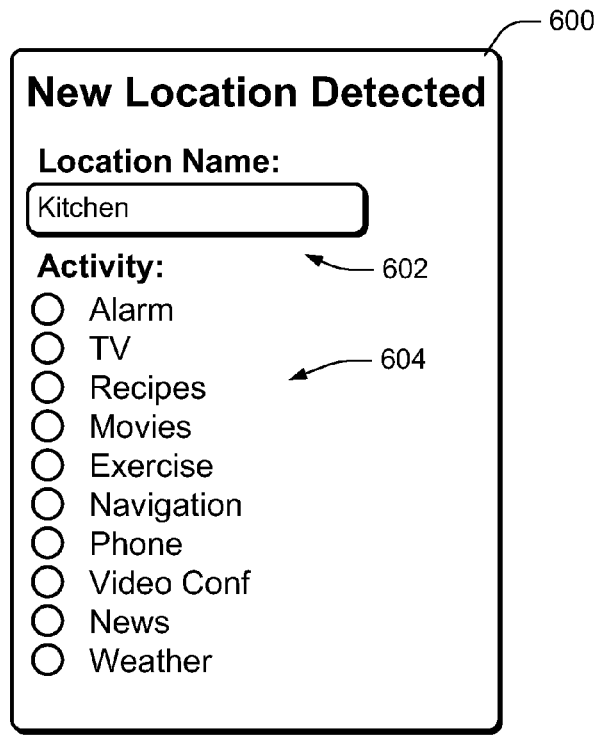
FIG. 6 is a screen diagram of a user interface that may be used in conjunction with the portable device of FIG. 1 to accept configuration information from a user.

As an example, FIG. 6 shows an example of a user interface screen 600 that may be displayed to a user by the personal device 102 upon connection to a previously unknown device rest 104. The user interface screen 600 may include a prompt and associated input field 602, prompting the user to provide a name for the location of the device rest 104. In addition, the user interface screen 600 may include a list 604 of different actions or activities that the user may wish to initiate at the location of the device rest 104. The user may select one of the activities, which will then be associated with the device rest 104.

In some cases, actions to be performed with a certain device rest 104 may be identified and associated with the device rest 104 by querying a network service such as an Internet-based provider. For example, when the device ID 322 identifies a type of peripheral equipment associated with the device rest 104, that act 508 may comprise querying a web-based service or source to identify and action and/or obtain an application to be associated with the device rest 104. In some cases, the ID 322 may identify the web-based source, such as by indicating an Internet address or other network address.

As discussed above, actions may comprise launching applications, performing commands, initiating functions, setting configurations, and so forth. Actions may be time dependent, so that different actions may be performed at different times of the day, week, month, year, and so forth. Furthermore, actions may be user dependent, so that they vary depending on the user currently logged onto the personal device 102. Thus, one user may associate one action with a particular location, while another user may associate a different action with the same location.

In some cases, actions may include configuring or operating a peripheral associated with the device rest 104. For example, the device rest 104 may be part of a peripheral, and an initiated action may comprise configuring or operating the peripheral in accordance with preferences that have been established by the user of the personal device 102 or by the manufacturer of the peripheral. In some cases, configuration information may be obtained from a network-based source. Thus, one type of action may comprise retrieving configuration information from a network-based host and configuring the peripheral based on the retrieved information.

In certain embodiments, the personal device 102 may also be configurable to perform desired actions upon removal or undocking from the device rest 104. For example, the personal device may be configured to execute a particular application or assume a particular configuration upon being removed from the device rest 104.

CONCLUSION

Note that certain of the techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A portable device for use with multiple device rests, the portable device comprising:
   one or more processors;
   one or more non-transitory computer-readable media storing computer-executable instructions that, when executed by the one or more processors, cause the one or more processors to perform acts comprising:
   receiving one or more selections of different actions;
   associating the different actions with different ones of the device rests, wherein the different actions comprise at least one of launching an application, performing a command, initiating a function, or setting a configuration;
   attempting to identify a particular device rest when the portable device is received by the particular device rest; and
   performing the action or actions associated with the particular device rest in response to identifying the particular device rest, wherein the actions comprise:
   configuring the particular device rest to communicate with a peripheral device;
   configuring the peripheral device based on information obtained from a network-based source;
   receiving information from the peripheral device;
   based at least in part on the information received from the peripheral device, configuring the portable device to interact with the peripheral device; and
   controlling the peripheral device from the portable device, wherein the controlling the peripheral device comprises sending operational instructions to the peripheral device, and wherein the operational instructions include operational information to control one or more components of the peripheral device.

2. The portable device of claim 1, wherein the actions further comprise launching applications on the portable device to communicate with the peripheral device.

3. The portable device of claim 1, wherein the actions further comprise:
   receiving additional information from a user; and
   modifying functions of the peripheral device based at least in part on the additional information received from the user.

4. The portable device of claim 1, wherein attempting to identify the particular device rest comprises receiving an identifier from the device rest.

5. The portable device of claim 1, wherein:
the multiple device rests comprise multiple instances of a product; and
attempting to identify the particular device rest comprises receiving a product instance identifier from the device rest, wherein the product instance identifier uniquely identifies the particular device rest among the multiple device rests.

6. The portable device of claim 1, wherein attempting to identify the particular device rest comprises receiving a location indicator from the device rest.

7. The portable device of claim 1, further comprising configuring the particular device rest with a location identifier.

8. The portable device of claim 1, further comprising configuring the particular device rest with a location identifier if the particular device rest is not identified when the portable device is received by the particular device rest.

9. The portable device of claim 1, further comprising prompting a user for an action to associate with the particular device rest if the particular device rest is not identified when the portable device is received by the particular device rest.

10. The portable device of claim 1, the acts further comprising querying a web-based service to identify the actions to implement.

11. The portable device of claim 1, wherein the particular device rest communicates with the peripheral device by one of a wired or near-field connection.

12. The portable device of claim 1, wherein the acts further comprise charging from the device rest when the portable device is received by the device rest.

13. One or more non-transitory computer-readable media storing computer-executable instructions that, when executed by a portable device, cause the portable device to perform acts comprising:
receiving a location identifier from a device rest when the portable device is received by the device rest, wherein the location identifier identifies one of a plurality of different locations; and
in response to receiving a location identifier identifying a particular one of the different locations, initiating actions associated with the particular one of the different locations, wherein the actions comprise:
configuring the device rest to communicate with a peripheral device;
configuring the peripheral device based on information obtained from a network-based source;
receiving information from the peripheral device; and
based at least in part on the information received from the peripheral device, configuring the portable device to control at least some operational functions of the peripheral device, wherein controlling the peripheral device includes accessing the internet, by the portable device, to obtain customized information and programming the peripheral device using the customized information.

14. The one or more non-transitory computer-readable media of claim 13, further comprising charging from the device rest when the portable device is received by the device rest.

15. The one or more non-transitory computer-readable media of claim 13, wherein the location identifier comprises a product instance identifier.

16. The one or more non-transitory computer-readable media of claim 15, wherein the product instance identifier identifies the device rest among multiple instances of the device rest, the product instance identifier being configurable by the portable device when the portable device is received by a chassis.

17. The one or more non-transitory computer-readable media of claim 13, wherein the location identifier is previously written to the device rest by the portable device.

18. The one or more non-transitory computer-readable media of claim 13, wherein the actions comprise launching one or more applications.

19. The one or more non-transitory computer-readable media of claim 13, the acts further comprising querying a web-based service to identify the actions.

20. A device rest for a portable device, comprising:
a chassis configured to receive the portable device;
a device port that identifies the device rest to the portable device when the portable device is received by the chassis, wherein identifying the device rest is based at least in part on a location identifier of the device rest; and
a peripheral connector that connects the device rest to a peripheral device, wherein in response to receiving information from the peripheral device, the portable device controls at least some operational functions of the peripheral device, and wherein controlling the peripheral device includes accessing the internet, by the portable device, to obtain customized information and programming the peripheral device, by the portable device, using the customized information.

21. The device rest of claim 20, wherein the device rest provides a product instance identifier to the portable device to identify the device rest.

22. The device rest of claim 20, wherein the device rest provides a product instance identifier to the portable device to identify the device rest among multiple instances of the device rest, the product instance identifier being configurable by the portable device when the portable device is received by the chassis.

23. The device rest of claim 20, wherein the device port charges the portable device when the portable device is received by the chassis.

24. The device rest of claim 20, wherein the device port indicates a location to the portable device when the portable device is received by the chassis.

25. The device rest of claim 20, wherein the device port comprises a wired data connection.

26. The device rest of claim 20, wherein the peripheral connector comprises one of a wired or near-field connection.

27. The device rest of claim 20, wherein the peripheral device comprises one or more components, and wherein the portable device controls at least some operational aspects of the one or more components of the peripheral device.

* * * * *